Oct. 12, 1965    D. SPORTE ETAL    3,211,033
DEPOSIT CONVEYOR
Filed Nov. 13, 1963    4 Sheets-Sheet 1
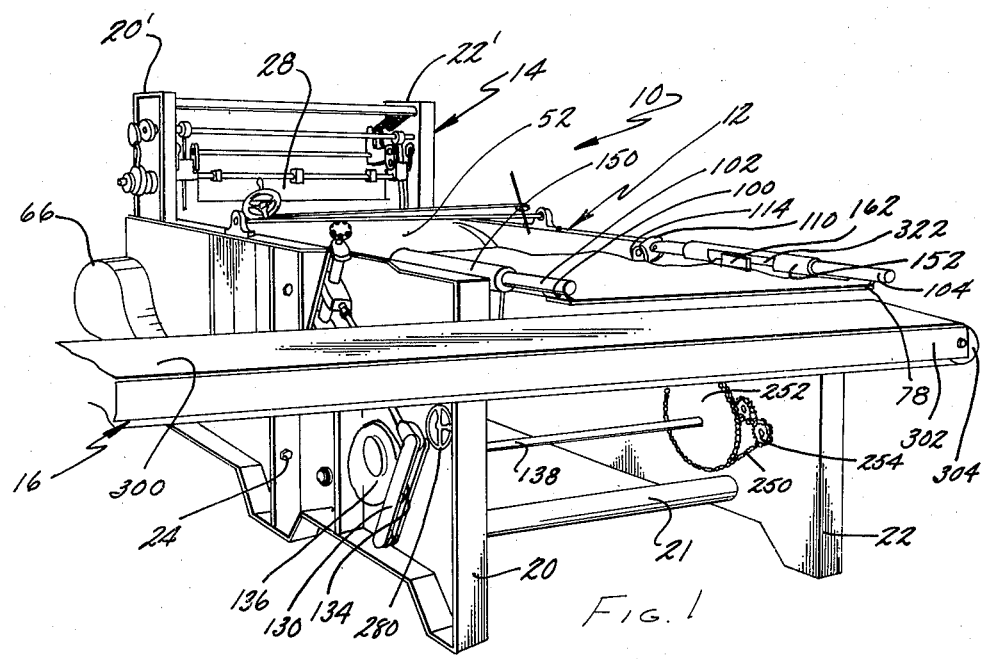
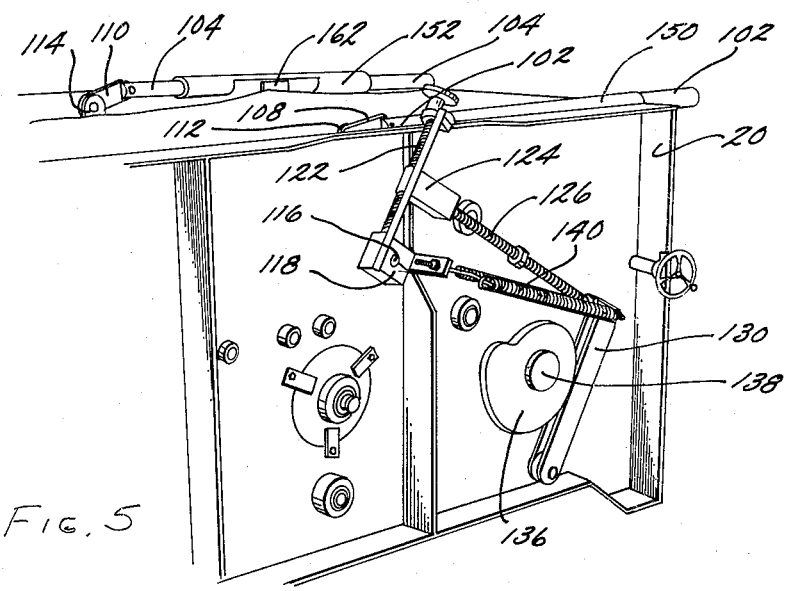
INVENTORS
DICK SPORTE
GERALD L. VOSHEL
BY HAROLD F. MILLER
Price and Henneld Oct. 12, 1965    D. SPORTE ETAL    3,211,033
DEPOSIT CONVEYOR
Filed Nov. 13, 1963    4 Sheets-Sheet 2

INVENTORS
DICK SPORTE
GERALD L. UOSHEL
BY HAROLD F. MILLER
Price & Heneveld

INVENTORS
DICK SPORTE
GERALD L. VOSHEL
BY HAROLD F. MILLER

Price & Henneld

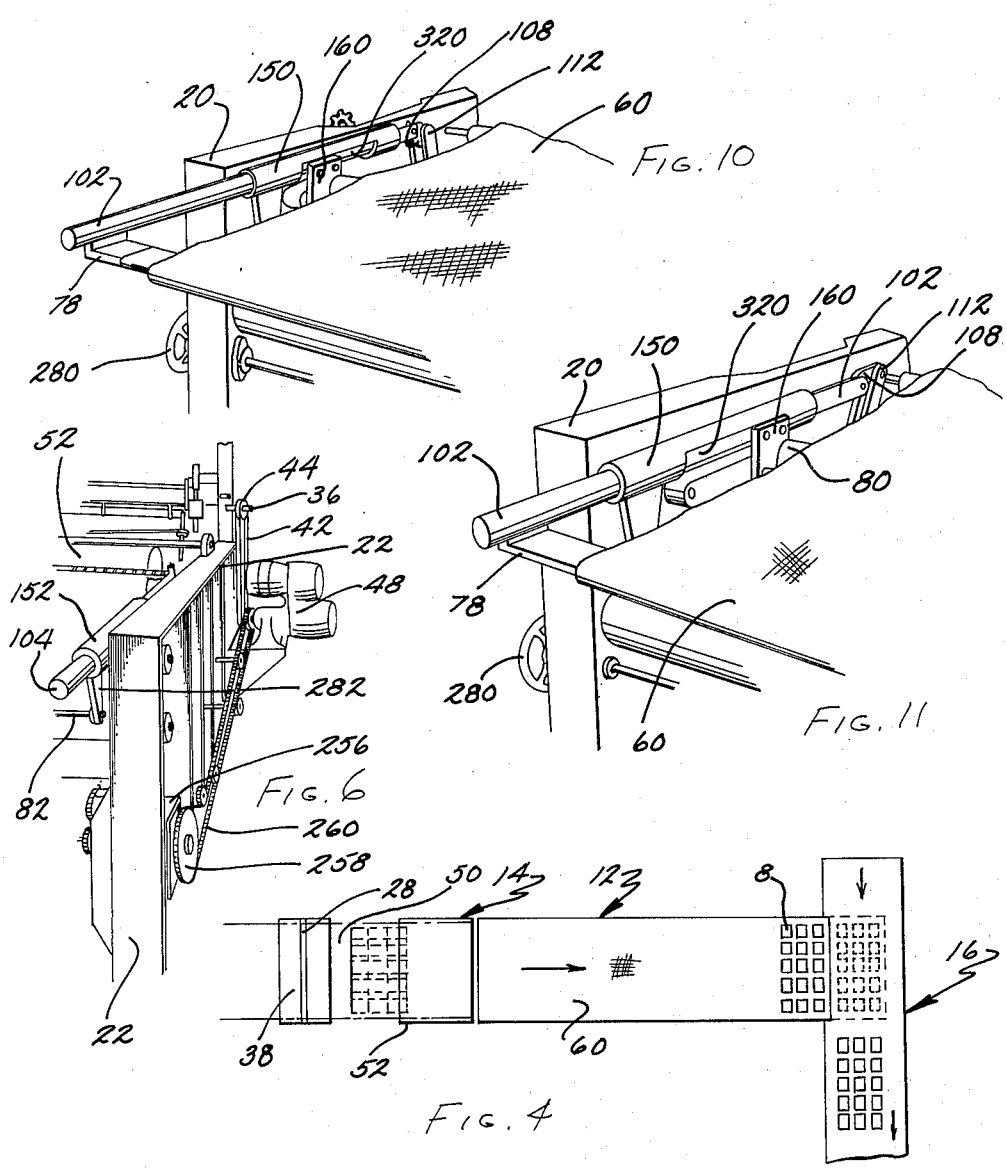

United States Patent Office 3,211,033
Patented Oct. 12, 1965

3,211,033
DEPOSIT CONVEYOR
Dick Sporte, Gerald L. Voshel, and Harold F. Miller, Grand Rapids, Mich., assignors to Werner Machinery Company, Grand Rapids, Mich., a corporation of Michigan
Filed Nov. 13, 1963, Ser. No. 323,379
3 Claims. (Cl. 83—112)

This invention relates to conveyor apparatus, and more particularly to a transfer conveyor capable of depositing a specific number of spaced articles onto a support surface while maintaining the articles in their spaced arrangement.

Packaging equipment for small articles such as cookies is usually supplied with spaced batches of cookies arranged in file with a predetermined spacing between the files and between the cookies in a file. To fill a cookie box with a certain number of cookies, the packager receives the specific number of cookies in a batch from a feed conveyor. Providing the proper arrangement of the spaced batches of cookies on the conveyor to the packager ordinarily requires considerable manual labor. Often, the cookies discharged from the cookie cutting equipment are discharged in adjacent rows, but must be fed to the packager in files.

It is therefore an object of this invention to provide transfer conveyor means that receives cookies from a high production cutter and deposits them in batches of predetermined spacing on an adjacent surface such as a packaging feed conveyor.

It is another object of this invention to provide a deposit conveyor capable of transferring rows of spaced articles in batches of orderly array on an adjacent conveyor, while maintaining the spacing between the articles.

It is another object of this invention to provide a transfer conveyor capable of transferring an arrangement of articles in batch fashion from one surface to another surface without disturbing the original arrangement of the articles on the first surface. This is done while the articles are moving horizontally on the first conveyor and on the second conveyor.

It is another object of this invention to provide a transfer conveyor apparatus capable of depositing rows of articles from one conveyor into files on another conveyor while changing the direction of travel of the articles but preserving their spaced relationship.

These and several other objects of this invention will become apparent upon studying the following specification in conjunction with the drawings in which:

FIG. 1 is a perspective view of the novel apparatus as viewed from the discharge end;

FIG. 4 is a schematic plan view of the apparatus showing article transfer;

FIG. 5 is an enlarged fragmentary perspective view of the discharge end of the apparatus shown from the side, and illustrating the vertical lift cam mechanism;

FIG. 6 is a fragmentary perspective view of the opposite side of the apparatus as the side illustrated in FIG. 1 and showing the drive means for the cutter and for the vertical and horizontal cam mechanisms;

FIG. 10 is a fragmentary perspective view of the discharge end of the apparatus in its extended raised position; and FIG. 11 is a fragmentary perspective view of the discharge end of the apparatus in its retracted lowered position.

Referring specifically to the drawings, the complete apparatus 10 includes the depositing conveyor sub-assembly 12 preferably combined with a cutter sub-assembly 14, and oriented to deposit articles such as cookies on a feed conveyor subassembly 16 for a packaging mechanism (not shown).

Figure 3:
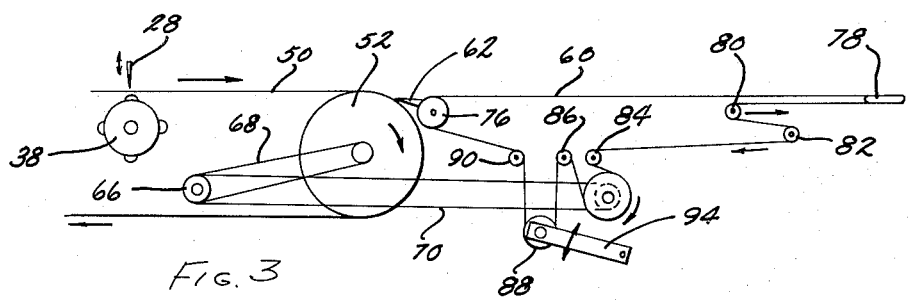
FIG. 3 is an elevational schematic view showing the operative relationship between the main components of the apparatus.

The sub-assemblies 12 and 14 are largely supported on a pair of spaced, vertical, elongated, rigid, metal frames 20 and 22. These are separated and supported by cross elements 21 (FIG. 1) and 23 (FIG. 3.) Each of these frames may be formed in two portions. The portion at the discharge end of the apparatus supports conveyor mechanism 12, and the portion at the opposite end supports cutter apparatus 14. Since these two sub-combinations are generally employed in combination with each other when cutting bakery goods such as cookies, the frame elements are bolted at 24 or otherwise secured together to the arrangement shown in FIG. 1.

Figure 2:
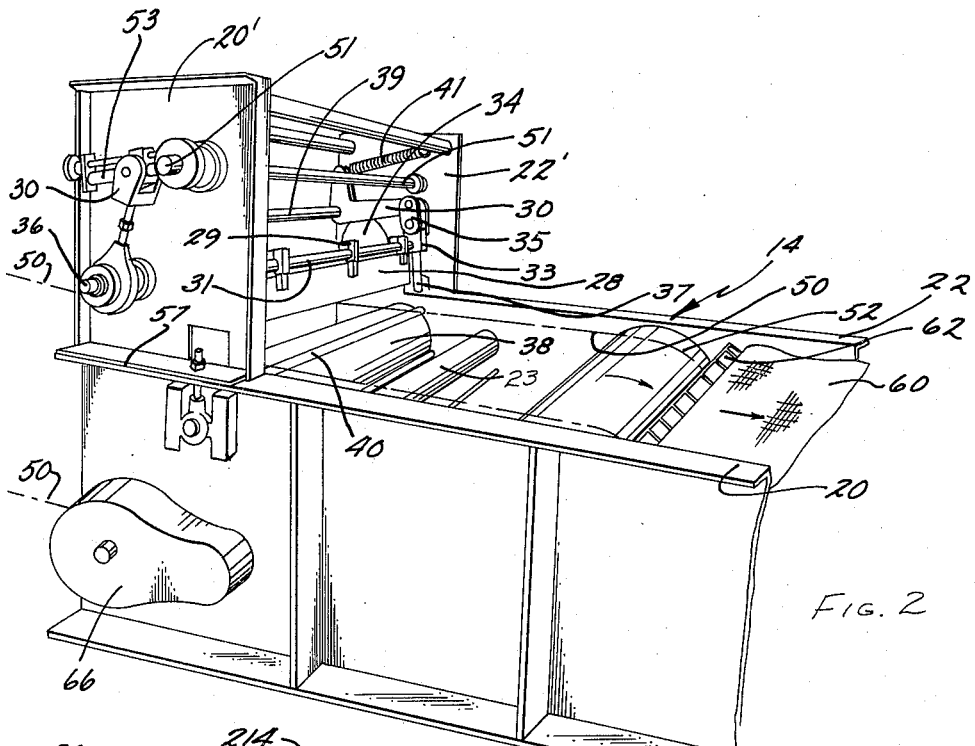
FIG. 2 is a fragmentary enlarged perspective view of the cutter apparatus employed with the mechanism.

The cutter mechanism 14 (FIG. 2) includes a vertically reciprocating cutting knife or blade 28. The blade is suspended on brackets 29 from rod 31 which has its ends supported on guide blocks 33. The blocks 33 reciprocate on vertical rods 37 on both ends and have their upper ends pivoted to links 35. The bars 37 are affixed by collars to cross pivot shaft 51 to allow an arcuate rocking of the blade. Each link 35 is pivotally attached at its upper end to an L-shaped cam follower pivotally supported on bar 39 and biased by tension coil spring 41 against the periphery of disc cam 34. It should be understood that each of these elements 33, 35, 37, and 30 have a like counterpart adjacent the opposite upstanding support 20' in the front of FIG. 2. Shaft 36, upon which cam disc 34 is mounted extends through side support 20' for attachment of the crank 30. Rotation of the shaft causes oscillation of crank 30 and thus of adjustable rocker arm 53 to pivot rod 51 through a small angle, and thereby to rock rods 37, and thus rock blade 28 during its reciprocation. This facilitates high speed cutting since the lowered cutting blade can shift laterally with the dough to allow the dough to keep moving while being cut. Shaft 36, and thus the cam 34, is rotated by a chain 42 (FIG. 6) around sprocket 44 from the gear box and motor 48. The blade reciprocates from a raised position as illustrated in FIG. 2 to a lowered position adjacent the back-up drum 38, and more specifically the raised ribs 40 thereon. This drum rotates in synchronism with the blade, and is driven by a chain drive from gear box and motor assembly 48 mounted to the side frame 22 (FIG. 6). This entire cutter blade and its drive mechanism are suspended between a pair of upright vertical extensions 20' and 22' connected at 57 to frame elements 20 and 22 (FIG. 2).

The baked cookies or other articles are passed beneath the blade on a suitable belt 50 shown in phantom in FIG. 2. This belt passes from the baking oven (not shown) on a continuous basis and moves around the rotating drum 52 to return to the oven.

As the blade 28 reciprocates against the belt 50, the baked slabs of dough are sliced into individual cookies. These are discharged onto the conveyor belt 60 of the depositing conveyor mechanism. A doctor knife 62 causes and guides the discharge of the cookies from belt 50 to belt 60. Belt 60 is shown formed of a metal chain type material, but may be of other material. Referring to FIG. 3, the operational relationship of belt 50 with respect to cutter blade 28 and its support drum 30 and conveyor belt 60 is illustrated.

A second motor and gear box drive assembly 66 (FIG. 2) mounted to frame element 20 is operably connected by chain 68 to drum 52 and by chain 70 to a drive roller 72 of the conveyor belt 60 (FIG. 3). The two belts will thus operate in synchronism.

The conveyor belt 60 passes successively around the following elements: roller guide 76 adjacent doctor knife 62, movable nose bar 78, a roller 80 shiftable with nose bar 78, a guide roller 82, guide roller 84, drive roller 72, guide roller 86, a weight biased slack take-up roller 88, and idler guide roller 90, back to the lead-on roller 76. The slack take-up roller 88 is mounted on the ends of a pair of pivotal arms 94 secured pivotally on their opposite ends to the side frame members 20 and 22. The weight of the roller maintains the belt 60 in a relatively taut condition.

Figure 7:
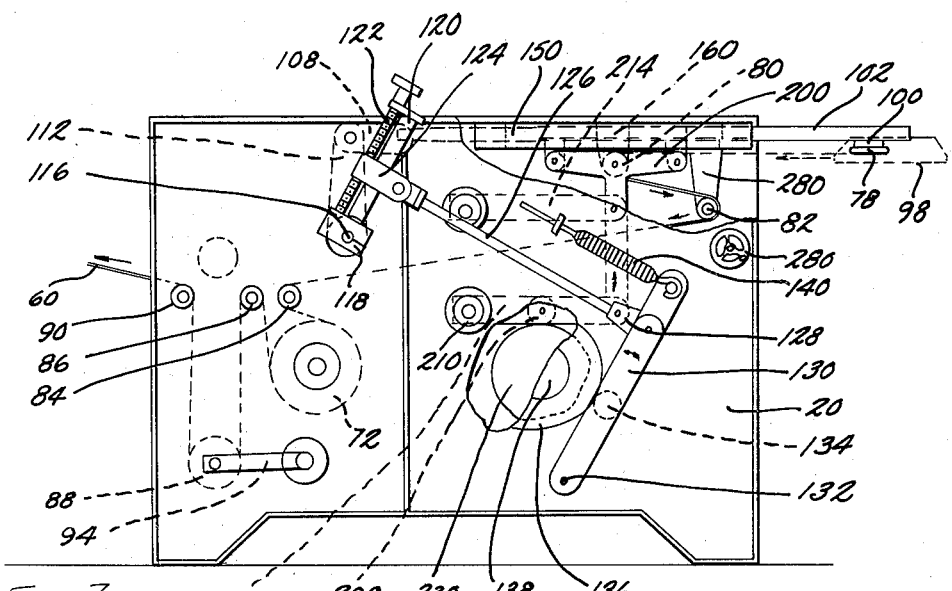
FIG. 7 is a fragmentary elevational view of the vertical and horizontal camming means of the conveyor belt oscillating mechanism.
Figure 8:
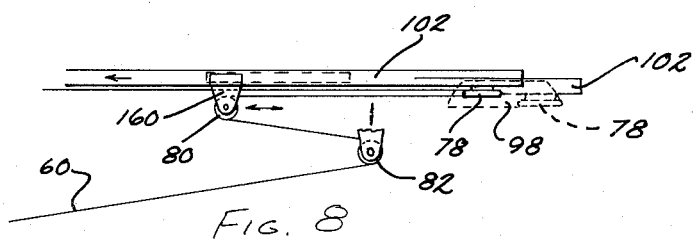
FIG. 8 is a fragmentary view of a portion of the conveyor belt oscillating apparatus illustrated in FIG. 7.

Nose bar 78 is mounted in a special manner to reciprocate both horizontally and vertically in the generally trapezoidal path illustrated at 98 in phantom in FIG. 7. This pattern of movement is achieved by simultaneously obtaining a vertical motion with one camming mechanism and a horizontal motion with a second camming mechanism, both camming mechanisms being driven from the same shaft. Referring specifically to FIG. 7 (and to FIGS. 10 and 11), nose bar 78 has upturned ends 100 affixed to the underside of a pair of spaced, parallel, horizontal, cylindrical rods 102 and 104 (FIGS. 1 and 5). The forward ends of the two rods 102 and 104 on which the nose bar is mounted extend beyond the ends of the frames 20 and 22. The rearward ends are pivotally attached to a pair of horizontal links 108 (FIG. 7, FIG. 10 and FIG. 11 ) and 110 (FIG. 1) for bars 102 and 104, respectively. These links 108 and 110 are in turn pivotally mounted to a pair of upwardly extending links 112 and 114 respectively (refer to same figures) which have their lower ends pivotally attached to the ends of a shaft 116. The shaft 116 extends between and is supported by side frames 20 and 22 (FIG. 7). Mounted to the end of this shaft etxending beyond frame 20 is a collar 118 (FIG. 7) having a rod 120 extending upwardly therefrom, as well as an adjacent screw 122. A sleeve-type collar 124 is slidably fitted on rod 120 and threadably engages screw 122. The screw can be rotated to move collar 124 on rod 120 to vary the distance between collar 124 and rod 116. Extending from and pivotally attached to collar 124 is a shaft 126 which is connected on its opposite end to a coupling 128. This coupling is pivoted to a rocker arm 130. Arm 130 is pivotally connected on its lower end to frame 20 at 132, and includes a cylindrical cam follower 134 mounted intermediate its ends. This cam follower contacts the peripheral camming surface 136 of the cam disc rotatably mounted on shaft 138. Refer also to FIGS. 1 and 5 for a showing of this apparatus. A tension coil spring 140 positioned either in the position illustrated in FIG. 5 or illustrated in FIG. 7 is secured between arm 130 and frame 20 to maintain the cam follower 134 in constant engagement with the peripheral surface of cam 136. Rotation of shaft 138 rotates cam 136 to oscillate arm 130 about its pivotal mount 132, thereby longitudinally oscillating rod 126 to rotatably oscillate shaft 116 through a small angle. This oscillates link 112 and link 108 through an arc to shift rods 102 and 104 horizontally forwardly and backwardly toward and away from the discharge end of the conveyor. It will be noted that rotation of screw 122 by its knob will shift the position of collar 124 with respect to shaft 116, thereby varying the radius of oscillation of this collar. This varies the length of oscillation movement of bars 102 and 104 as necessary. This adjustment mechanism is similar to that at 53 on the cutter bar rocker in FIG. 2.

The shiftable roller 80 around which belt 60 passes (FIGS. 3 and 7) is fixedly mounted with respect to rods 102 and 104 by being suspended on a pair of brackets 160 and 162 (FIGS. 1, 5, 7, 8, 10 and 11). These brackets have their upper ends fixedly attached to bars 102 and 104 as by screws (FIG. 11). Thus, this guide bar moves the same amount as the nose bar 78 to constantly feed off belt when the nose is being extended and to take up the slack when the nose is being retracted. This is to be explained more fully hereinafter. Also, since rods 102 and 104 reciprocate vertically, as explained hereinafter, guide roller 80 also reciprocates vertically as well as horizontally.

The bars 102 and 104 slide forwardly and rearwardly in a pair of annular sleeves 150 and 152 (FIG. 1). To obtain the vertical oscillation of the nose bar simultaneously with the horizontal oscillation just described, these sleeves are vertically reciprocated by a second camming mechanism.

Figure 9:
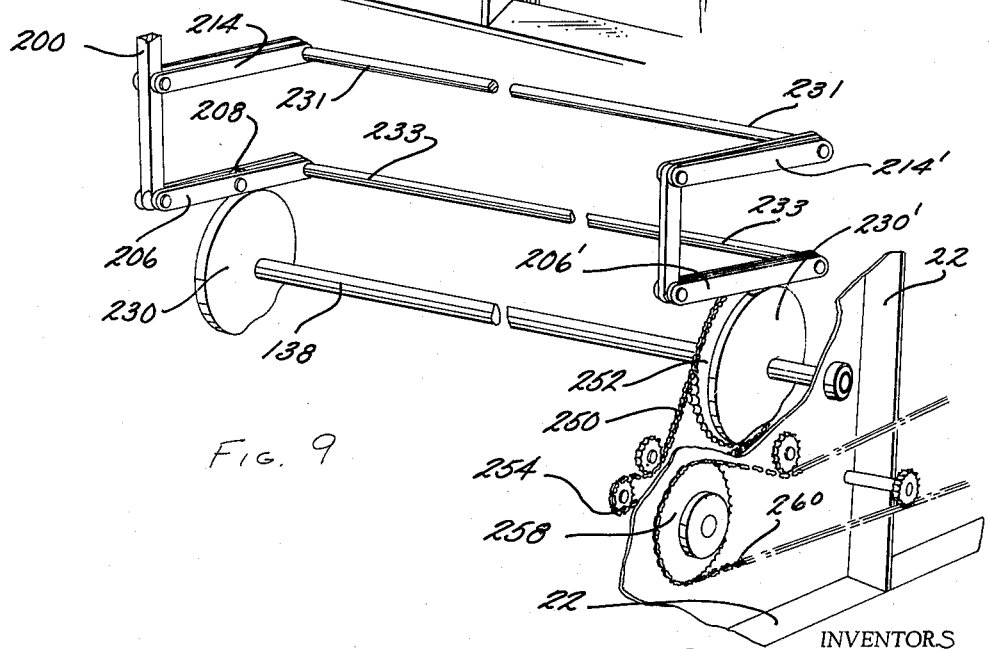
FIG. 9 is a fragmentary perspective view of the vertical camming mechanism of the apparatus.

A T-shaped member 200 is attached to sleeves 150 and 152 (FIG. 7) on the opposite ends of the cross member of the T. It should be noted that roller member 80 is not attached to this T bracket. The vertical portion of this T has its lower end attached to rocker arm 206. This arm includes a cam follower 208 intermediate its ends and has its rearward end pivotally attached at 210 to frame 20. Intermediate the ends of the vertical member of the T bracket 200 is a second guide arm 214 which has its opposite end pivotally attached to frame 20. This parallelogram created by the two arms maintains the sleeves in a horizontal position, and prevents them from tilting or cocking during the oscillation. This T-shaped member is mounted on the inside wall of frame member 20. The frame member 20 is shown cut away in FIG. 7 to illustrate this member. Cam follower 208 on arm 206 engages the peripheral surface of a second pair of cam discs 230, also mounted on shaft 138, but normally positioned adjacent the inside wall of frame member 20. Although only one vertical motion cam is shown in FIG. 7, a second vertical motion cam is positioned adjacent the opposite frame element 22 as shown in FIG. 9. Rotation of shaft 138 therefore rotates cam 230 simultaneously with rotation of cam 136, to cause the arm 206 to oscillate vertically about its pivotal point 210, as well as arm 214, thereby repeatedly raising T-shaped member 200 and lowering it again to raise and lower sleeves 150 and 152, and thus rods 102 and 104 contained in these sleeves. Also arms 206' and 214' oscillate on cam 230', as well as the connecting rods 231 and 233. This vertical reciprocation occurs simultaneously and in a special synchronized fashion to the horizontal reciprocation of the rods 102 and 104 inside of these sleeves 150 and 152. The result is a motion path 98 which is substantially frustoconically shaped in pattern as illustrated in phantom FIG. 7 and FIG. 8.

The crank 280 illustrated adjacent the frame member 20 in FIG. 7 is mounted on a shaft which extends clear across the apparatus and through frame 22 into gear box 256, to enable control of the gear box output and thus of the rotation rate of the camming elements 136 and 230.

Shaft 138 is driven by a chain 250 (FIG. 9) which passes around sprocket 252 (FIG. 1). Chain 250 is driven by sprocket 254 from the output drive of differtial gear box 256 (FIG. 6). This differential gear box is driven by a sprocket 258 from chain 260. This chain extends the length of the frame member 22 as shown in FIG. 6, and is driven by motor and gear box mechanism 48. Suitable idler sprockets, as shown in FIG. 6, are employed to guide the chain in its long path.

The conveyor sub-assembly 16 shown in FIG. 1 and also in FIG. 4 is normally positioned transversely to conveyor belt 60 and includes any suitable conveying means such as a belt 300 mounted on frame members 302, and traveling around rotational drive rollers 304 to feed the articles such as cookies, to packaging mechanism (not shown), for example.

Two of the positions of the mechanism to cooperate with this take-off conveyor 16 are illustrated in FIGS. 10 and 11. In FIG. 10, the nose bar 78 is extended away from the apparatus and is in its most elevated position. Thus, brackets 160 are at the forward end of the elongated slot 320 in the sleeve 150. The opposite bracket 162 is also at the same time in the forward end of slot 322 (FIG. 1) in sleeve 152. When the nose bar is in its lowered and retracted position (FIG. 11), the brackets 160 are at the rearward end of slot 320 in sleeve 150 and bracket 162 is at the rearward end of slot 322 in sleeve 152. Also, rods 102 and 104 as well as sleeves 150 and 152 are lowered with respect to frame members 20 and 22, as is obvious from a comparison of FIGS. 10 and 11. The purpose of this mechanism is to extend a section of conveyor belt 60 on which a plurality of cookies are supported (as illustrated by the schematic view in FIG. 4) and then to retract both the belt and conveyor nose bar 78 from beneath the cookies so that the cookies are deposited in their pre-arranged batch on the second conveyor 16, without disturbing their relationship with respect to each other. The mechanism thus goes through a cycle of extension, lowering, and retraction and raising, in repeated fashion for batches of articles on belt 16. This will be more fully understood from the detailed description of operation to follow.

*Operation*

The operation of this novel mechanism, especially in combination with the cutter apparatus, will be described with respect to the processing of cookies or similar baked articles since this is the environment and the use for which the apparatus was developed. It will be clear, however, that the novel apparatus may conceivably be utilized for other types of articles and can be used without the cutter mechanism when it is desired to deposit batches of articles from one conveyor to a second surface or to another conveyor, without disturbing the batch relationship and spacing involved. It also achieves a change in directional flow of the batch, so that articles can move from "row" orientation to "file" orientation. Consequently, the apparatus, although particularly advantageous and useful when combined with a cutter and used in this environment, should not be limited to this use or environment or combination within its broadest concept.

To utilize the apparatus to process cookies, conveyor belt 50 transfers the baked cookie slabs in elongated form from the oven (not shown) to cutter assembly 14. Movement of belt 50 is achieved by motor drive mechanism 66 (FIGS. 1 and 3) to drive belt 50 through drum 52 and belt 60 through powered roller 72. Also, at the same time, the power motor mechanism 48 is actuated to drive reciprocating cutter blade 28 through its cam mechanism, (FIG. 6) and also the vertical and horizontal camming mechanism for the oscillating nose bar. As the cutter blade 28 reciprocates vertically from a spaced position above belt 50 to a position adjacent the belt 50 and ribs 40 (FIG. 2) of drum 38, the cookies are sliced transversely to form individual cookies in rows, illustrated for example, by the three rows of cookies 8 on belt 60 in FIG. 4. These will normally be in substantially the condition illustrated on the left side of FIG. 4. The cutter 28 oscillates to achieve cutting, during belt movement.

As the cookies move along belt 50 over the upper surface of drum 52, they slide over doctor blade 62 onto continuously moving belt 60. The cut rows of cookies are spaced slightly by passage over the blade 62. They then travel with belt 60 to the discharge end of the conveyor. Meanwhile, the discharge end of belt 60 is moving through its path 98 illustrated in FIGS. 7 and 8. The forward extension of nose bar 78 is preferably adjusted to be equal in rate of movement to the rate of feed of belt 60. This adjustment is achieved by rotating screw shaft 122 to control the position of the nose bar. Thus, the portion of the belt curled around the front edge of nose bar 78 stays in the same position with respect to the nose bar as the latter is shifted forwardly. A batch of cookies, as illustrated in FIG. 4 on the forward end of this nose bar, is thus transported bodily over the top of the conveyor mechanism 16. When the nose bar with its rods 102 and 104 reach the full extension over conveyor 16, the camming mechanism 136 and 230 cause the nose bar to drop vertically and then retract to cause the entire batch of cookies to be deposited in their same array on the surface of conveyor 16, as illustrated by the phantom lines in FIG. 4. The nose bar comprises a front support which cooperates with the rear belt support roller 76 to position the upper part of the belt in a generally horizontal plane.

When the nose bar is retracted, roller 80 automatically takes up the slack in the belt which would otherwise occur adjacent the nose bar if the belt were not retracted also. Any small differential between these is constantly taken up by the weight of roller 88 (FIG. 7) to maintain the belt taut. When the nose bar is extended, the roller 80 moves forwardly also to feed off belt sufficient to accommodate the extension. The camming mechanism are pre-designed to cause a batch at a time of the cookies to be extended and deposited on conveyor 16, followed by retraction of the mechanism to subsequently extend another batch.

It will be noted from FIG. 4 that the cookies which were moving in rows subsequently move along conveyor 16 in file form. They thus can be transferred and transported, without any manual labor, to the cookie packaging mechanism in their proper array, number and spacing. The apparatus operates continuously, passing through this cycle of actions with each batch of articles. From extensive test runs, it has been found that it is completely dependable, and uniquely achieves the results desired. It cooperates especially well with a cutter mechanism when the movements of the devices are synchronized. This synchronization is achieved by utilizing variable speed motor and drive means to operate both the cutter apparatus and the deposit conveyor mechanism. Various additional uses to those mentioned herein, as well as many advantages not specifically recited, will be apparent to those skilled in this field when studying the form of the invention depicted. Also, certain obvious modifications to achieve the depositing action, may be made in this specific form shown without departing from the principles and concepts taught herein. Thus, this invention is not to be limited merely to the one preferred form illustrated, but only by the scope of the appended claims and the reasonably equivalent structures to those defined therein.

We claim:

1. A batch depositing conveyor comprising: a pair of spaced interconnected frames; an endless conveyor belt between said frames; belt guide means for said belt and supported between said frames, and including a rear support and a front support to hold the upper portion of said belt generally horizontally; belt drive means engaging said belt to continuously move it in its endless path; said front support being attached to a pair of parallel bars which are oriented in the direction of movement of said upper belt portion; linkage connected to said bars and including cam follower means; rotational horizontal cam means mounted to said frames and engaged with said cam follower means to cause horizontal reciprocation of said bars to extend and retract said front support and a portion of said belt; said bars being slidably supported in a pair of sleeves; said sleeves being supported on linkage including second cam follower means; vertical cam means mounted to said frames and engaging said second cam follower means to raise and lower said sleeves, bars, front support and a portion of said belt; and said horizontal and vertical cam means being connected to drive means causing said front support and belt to be extended, then rapidly lowered and retracted to deposit articles therefrom, after which they are raised again.

2. A batch depositing conveyor comprising: a pair of spaced interconnected frames; an endless conveyor belt between said frames; belt guide means for said belt and supported between said frames, and including a rear support and a front support to hold the upper portion of said belt generally horizontally; belt drive means engaging said belt to continuously move it in its endless path; said front support being attached to a pair of parallel bars which are oriented in the direction of movement of said upper belt portion; linkage connected to said bars and including cam follower means; rotational horizontal cam means mounted to said frames and engaged with said cam follower means to cause horizontal reciprocation of said bars to extend and retract said front support and a portion of said belt; said bars being slidably supported in a pair of sleeves; and said horizontal cam means being connected to drive means causing said front support and belt to be extended, then rapidly retracted to deposit articles therefrom, after which they are raised again.

3. A batch depositing conveyor comprising: a pair of spaced interconnected frames; an endless conveyor belt between said frames; belt guide means for said belt and supported between said frames, and including a rear support and a front support to hold the upper portion of said belt generally horizontally; belt drive means engaging said belt to continuously move it in its endless path; said front support being attached to a pair of parallel bars which are oriented in the direction of movement of said upper belt portion; linkage connected to said bars and including cam follower means; rotational horizontal cam means mounted to said fames and engaged with said cam follower means to cause horizontal reciprocation of said bars to extend and retract said front support and a portion of said belt; said bars being slidably supported in a pair of sleeves; said sleeves being supported on linkage including second cam follower means; vertical cam means mounted to said frames and engaging said second cam follower means to raise and lower said sleeves, bars, front support and a portion of said belt; and said horizontal and vertical cam means being connected to drive means causing said front support and belt to be extended, then rapidly lowered and retracted to deposit articles therefrom, after which they are raised again; reciprocating cookie cutter means also supported by said frames; a cookie slab conveyor belt beneath said cutter means and extending adjacent said rear support; transfer means between said cookie conveyor belt and said endless belt; and synchronized drive means operably connected to said cutter means and to said cam means to deposit controlled amounts of cut cookies.

References Cited by the Examiner
UNITED STATES PATENTS

| | | | |
|---|---|---|---|
| 941,296 | 11/09 | Baker | 198—139 X |
| 1,041,439 | 10/12 | Dearborn | 198—139 |
| 1,291,844 | 1/19 | Green | 198—76 |
| 1,686,696 | 10/28 | Hirschmann | 198—219 |
| 2,073,097 | 3/37 | Dziedzic | 198—219 X |
| 3,106,280 | 10/63 | Baker | 198—139 |

SAMUEL F. COLEMAN, *Primary Examiner.*
EDWARD A. SROKA, *Examiner.*